(12) United States Patent
Manku

(10) Patent No.: US 9,014,625 B2
(45) Date of Patent: *Apr. 21, 2015

(54) METHOD AND APPARATUS FOR GENERATING DEDICATED DATA CHANNELS IN INDUCTIVE COUPLED RFID SYSTEMS USING BAND-PASS MODULATION

(75) Inventor: Tajinder Manku, Waterloo (CA)

(73) Assignee: Tag-Comm Inc., Waterloo (CA)

( * ) Notice: Subject to any disclaimer, the term of this patent is extended or adjusted under 35 U.S.C. 154(b) by 212 days.

This patent is subject to a terminal disclaimer.

(21) Appl. No.: 13/482,083

(22) Filed: May 29, 2012

(65) Prior Publication Data

US 2013/0324033 A1 Dec. 5, 2013

(51) Int. Cl.
*H04B 5/00* (2006.01)

(52) U.S. Cl.
CPC ............ *H04B 5/0062* (2013.01); *H04B 5/0075* (2013.01); *H04B 5/0081* (2013.01)

(58) Field of Classification Search
CPC combination set(s) only.
See application file for complete search history.

(56) References Cited

U.S. PATENT DOCUMENTS

| 5,523,726 | A  | * | 6/1996 | Kroeger et al. | 332/103 |
| 8,384,519 | B2 | * | 2/2013 | Kuhl et al. | 340/10.1 |
| 8,548,087 | B2 | * | 10/2013 | Trachewsky et al. | 375/267 |
| 2008/0246667 | A1 | * | 10/2008 | Symons | 343/702 |
| 2010/0052869 | A1 | * | 3/2010 | Stewart | 340/10.52 |

OTHER PUBLICATIONS

Sommarek, et al., "A Digital Modulator with Bandpass Delta-Sigma Modulator", Sold-State Circuits Conference, 2004, ESSCIRC 2004, Proceedings of the 30th European, pp. 159-162, Sep. 21-23, 2004.*
International Search Report and Written Opinion, Mailed Feb. 18, 2013, for Corresponding PCT International Patent Application No. PCT/CA2012/000569.

* cited by examiner

*Primary Examiner* — Lewis West
(74) *Attorney, Agent, or Firm* — Gowling Lafleur Henderson LLP

(57) ABSTRACT

An inductive coupling apparatus for modifying an incoming radio frequency (RF) signal includes an inductive element. A variable impedance circuit includes an output electrically coupled to the inductive element. A band-pass delta sigma modulator is coupled to the variable impedance circuit and digitally controls the output of the variable impedance circuit. The incoming RF signal is modified as the coupled impedance of the inductive element is adjusted in accordance with the output of the variable impedance circuit.

16 Claims, 10 Drawing Sheets

METHOD AND APPARATUS FOR GENERATING DEDICATED DATA CHANNELS IN INDUCTIVE COUPLED RFID SYSTEMS USING BAND-PASS MODULATION

FIELD OF THE INVENTION

The present invention relates generally to a method and apparatus for generating dedicated data transmission channels in inductive coupled radio frequency communication networks using band-pass modulation.

BACKGROUND OF THE INVENTION

Radio Frequency Identification (RFID) systems are commonly used to locate and track items in a near-field communication network including a reader device and at least one wireless terminal, or tag. Energized time-varying electromagnetic radio frequency (RF) waves, which comprise the carrier signal, are transmitted from the reader to the tags in a given RFID network or system. Inductive coupling may be used to transfer energy from one circuit (such as a conductive antenna coil and associated circuitry) to another by means of mutual inductance between the two circuits. A voltage is induced in the tag that can be rectified and used to power the tag circuitry. RFID networks may include tags and readers which exchange information using such inductive coupling between their inductive coupling coils (or antenna coils). To enable data to be passed from the tag to the reader, the tag circuitry changes or varies the load, which is referred to herein as a coupled impedance associated with the inductive coupling coil or element. This change can be detected by the reader as a result of the mutual inductive coupling, whereby a reader-originated RF signal can be modified by the tag to transmit encoded data.

FIG. 1a depicts a prior art RFID system in which data transmission from tags 101a-c to reader device 103 is performed on a same frequency channel or spectrum 104. Using the established inductive coupling technology, each of the plurality of tags typically in the RFID system or network sends RF signals using the modified carrier signal. Hence, the modified RF signals from each tag overlap those of other tags within the same RF frequency spectrum associated with a given reader device in the RFID network.

As a consequence, tag collision in RFID systems occur when the multiple tags are energized by the same RFID reader device, and simultaneously modify their respective, overlapping signals back to the reader using the given frequency channel. Thus the tag collision problem is exacerbated whenever a large number of tags must be read together in the same RF field. The reader is unable to differentiate these signals when the simultaneously generated signals collide. The tag collisions confuse the reader, generate data transmission errors, and generally reduce data throughput within the RFID system or network.

Various systems have been proposed to isolate individual tags. For example, in one technique aimed at reducing collision errors, when the reader recognizes that tag collision has taken place, it sends a special "gap pulse" signal. Upon receiving this signal, each tag consults a random number counter to determine the interval to wait before sending its data. Since each tag gets a unique number interval, the tags send their data at different times. The adverse impact on overall RFID system performance, in terms of data throughput rate, however, still exists.

Modulating the signal received by the tag and inductively coupling the modulated signal to the reader device is known, using such signal modulation schemes as phase shift keying (PSK) and amplitude shift keying (ASK), where the tag changes its associated impedance by changing the impedance match between states. However, the adverse effects of tag collisions resulting from overlapping modified signals on a given frequency channel still remain when using these known signal modulation schemes.

Moreover, especially pertinent in the context of a reader device of an RFID network is the effect of the DC offset in the reader device and the effects of the reader's phase noise.

In an inductive coupled RFID system, the underlying coils are defined by their physical size and structure. It is well know that a coupling system of the two coils can replaced by an equivalent transformer. The connection between these two coils is given by the magnetic field (B) and the underlying value to describe this connection is the mutual inductance (M) and/or the coupling factor (k).

FIG. 1b shows a prior art inductive coupled RFID system. The applicable Biot-Savart relationship is:

$$\vec{B} = \frac{\mu_0 i_1}{4\pi} \oint_S \frac{\vec{ds} \times \vec{x}}{|\vec{x}|^3}$$

This allows the calculation of the magnetic field at every point as function of the current, $i_1$, as well as the geometry. In this equation (1), $u_0$ describes the permeability, x stands for the distance and S describes the integration-path along the coil. Besides this, the mutual inductance and the coupling factor are given by:

$$M = \int_{A_2} \frac{B(i_1)}{i_1} dA_2$$

$$k = \frac{M}{\sqrt{L_1 L_2}}$$

Here A2 describes the area of the second coil, while L1 and L2 describe the inductance of the two coils. The distance between the reader-coil and transponder-coil also determines the coupling factor.

Still with reference to FIG. 1b, the impedance as seen by the reader device is:

$$Z_{in} = \omega^2 M^2 [Y_1 + Y_2]$$

where ω is the operating frequency in rads/s, M is the mutual inductance, $Y_1+Y_2$ are the admittances within the tag device. Here, $L_1$ and $L_2$ are in resonance with the capacitors $C_1$ and $C_2$, respectively. The $Y_1+Y_2$ admittances are modulated to transfer information back to the reader. The $Y_1+Y_2$ are either modulated via amplitude (ASK) or in-phase (PSK). $Y_1+Y_2$ can also be modulated using multi-phase PSK and multi-amplitude ASK, but this poses an issue on the Q of the resonance of $L_1 C_1$ and $L_2 C_2$.

The admittances $Y_1+Y_2$ are modulated such that most of the data in frequency domain sits near DC. This poses a problem for the reader device since it has to distinguish the actual signal from DC offsets that may be produced by the reader itself; for example, the operating frequency of the reader leaks back into itself producing a DC, or the phase noise of the oscillator used in the reader becomes (undesirably) superimposed on the modulated signal.

SUMMARY OF THE INVENTION

Provided is an inductive coupling apparatus for modifying an incoming radio frequency (RF) signal. The inductive coupling apparatus comprises an inductive coil or element, a variable impedance circuit having an output electrically coupled to the inductive element, and at least one band-pass delta sigma (ΔΣ) modulator coupled to the variable impedance circuit and digitally controlling the output of the variable impedance circuit, wherein the incoming RF signal is modified in accordance with a coupled impedance characteristic of the inductive element being adjusted based on the output of the variable impedance circuit.

In one embodiment, an output of the at least one band-pass delta sigma modulator switches the output of the variable impedance circuit between two states to adjust the coupled impedance z.

In another embodiment, an input signal applied to the band-pass delta sigma modulator consists of one of a complex modulation signal offset from the incoming radio frequency signal by $+/-\omega_0$.

The complex modulation signal may consists of any of a GMSK, QPSK, nPSK, nQAM, and an OFDM signal.

In an embodiment of the inductive coupling apparatus, an output of the band-pass delta sigma modulator is one of a return to zero (RTZ) and a non-return to zero (NRZ) type signal.

The inductive coupling apparatus may comprise, in one embodiment, an IQ up-conversion modulator wherein the digitally controlled output is generated from an in-phase—quadrature (IQ) up-converted signal input to the band-pass delta sigma modulator.

In yet another embodiment, the input data provided to the IQ up-conversion module consists of one of a GMSK, QPSK, nPSK, nQAM, and an OFDM signal format.

The inductive coupling apparatus may comprise part of a tag terminal electromagnetically coupled to a reader device within a radio frequency identification (RFID) system wherein generation of data from the IQ up-conversion modulator is based on a clock circuit internal to the tag terminal.

In another embodiment. generation of data from the IQ up-conversion modulator is based on a clock circuit using a carrier signal frequency of the reader device, frf, divided by M, where M represents a positive numerical value.

Clocking for the IQ up-conversion modulator, in one embodiment, may based on a clock circuit internal to the tag terminal.

In another embodiment, clocking for the IQ up-conversion modulator may be based on a clock circuit using a carrier signal frequency of the reader device, frf, divided by N, where N represents a positive numerical value.

In a further embodiment of the inductive coupling apparatus, the inductive element comprises part of a tag terminal, the tag terminal electromagnetically coupled to a reader device within a radio frequency identification (RFID) system, the RFID system comprises clocking the band-pass delta sigma modulator using a clock circuit within the tag reader.

In an alternate embodiment, clocking the band-pass delta sigma modulator uses a clock circuit generated based on a frequency of the incoming RF signal divided by L, where L represents a positive numerical value.

BRIEF DESCRIPTION OF THE DRAWINGS

The invention will now be described by way of example only with reference to the following drawings in which.

DETAILED DESCRIPTION

The term modulation as used herein refers to the process by which the radio frequency identification (RFID) wireless terminal, or tag, changes the carrier radio frequency (RF) signal of the reader inductive coupling apparatus to encode and convey information. For instance, in phase modulation, data being transmitted from the reader device to the tag is encoded in changes in the phase of the carrier wave sent out by the RFID reader device.

Figure 1A:
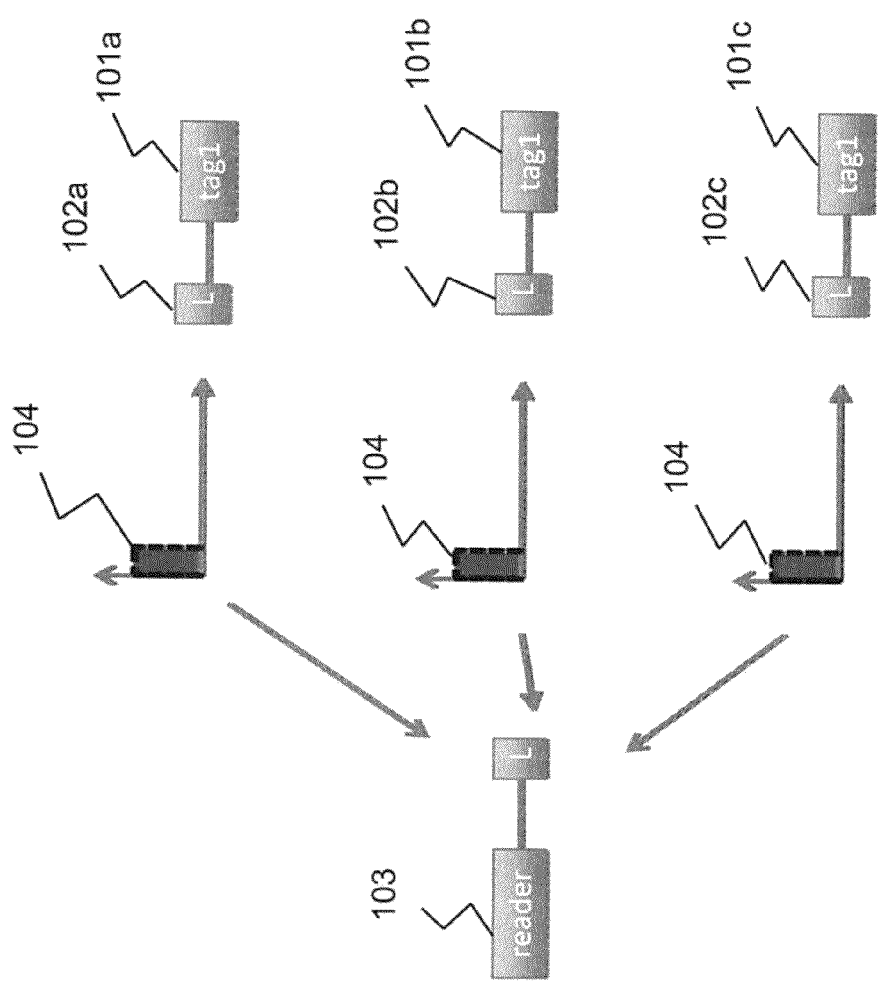
FIG. 1a shows a prior art inductive coupled RFID system in which data transmission from tag to reader is performed on a same frequency channel.
Figure 1B:
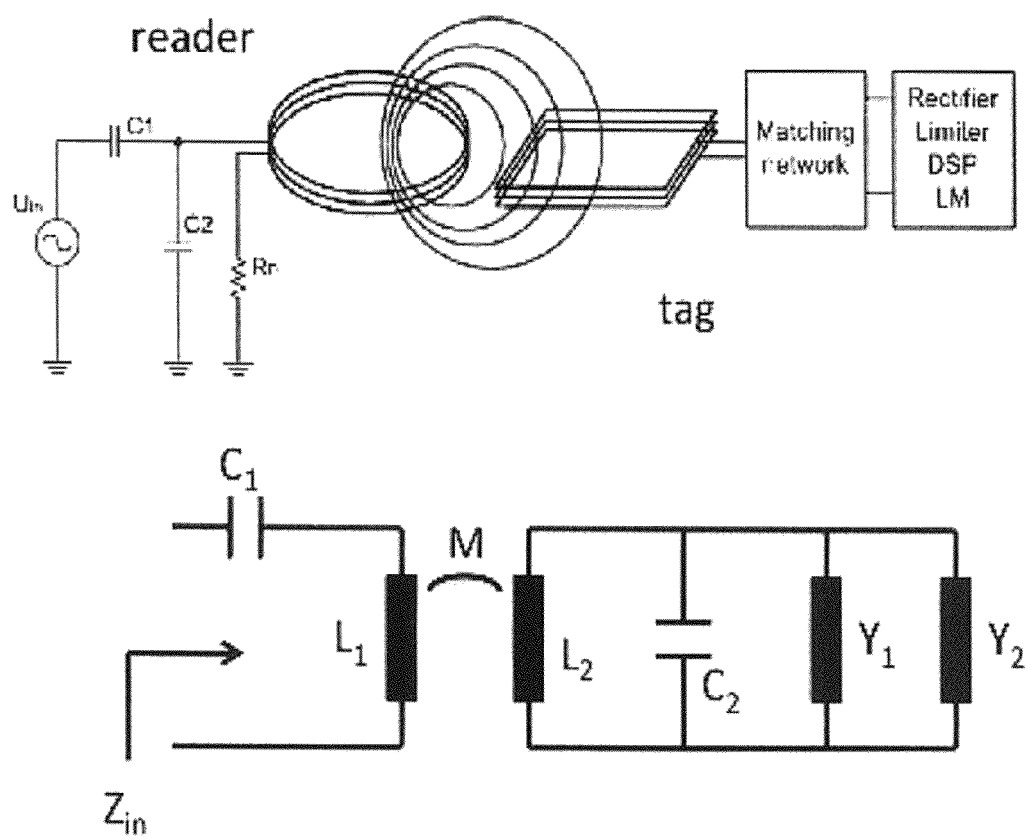
FIG. 1b shows a representative model of a prior art inductive coupled RFID system.
Figure 2:
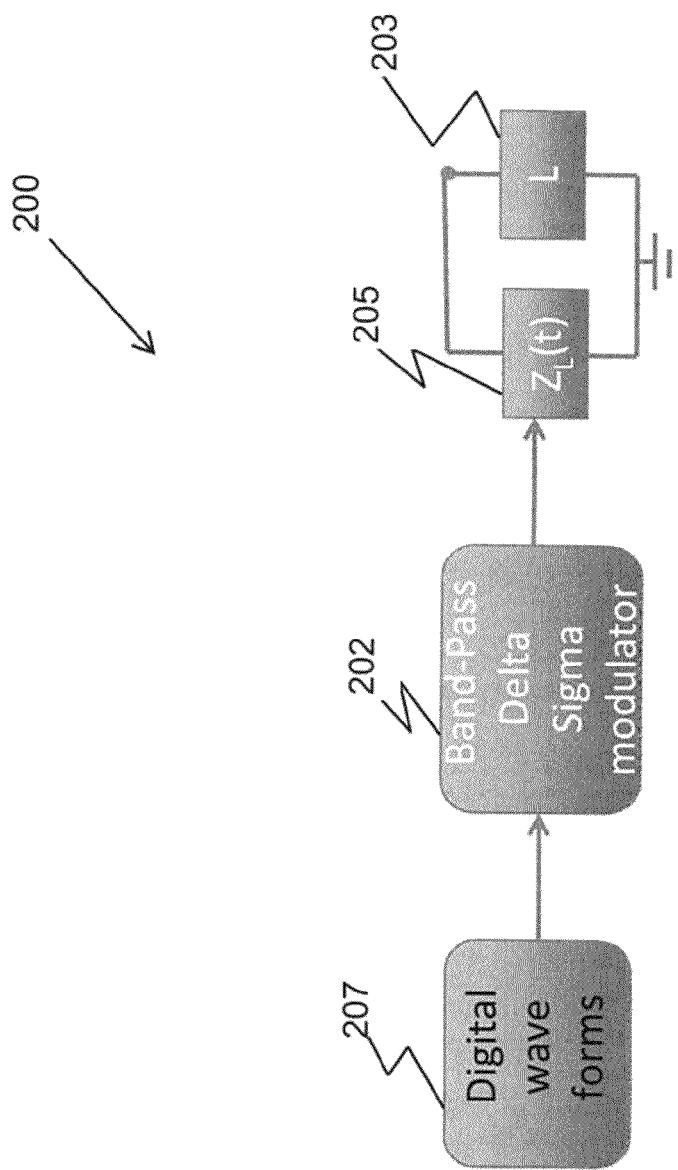
FIG. 2 shows, in one embodiment, an apparatus using band-pass modulation for generating a varying impedance coupled to the inductive element.

FIG. 2 shows, in one embodiment, an inductive coupling apparatus 200 of a wireless communication system, such as a radio frequency identification (RFID) communication network, which may be passive or semi-passive, for generating a varying (or modulating) impedance 205 at inductive element 203 to modify an incoming radio frequency (RF) signal such as from a reader device of the RFID network. Inductive element 203, which may be part of a tag terminal of the RFID communication network, modifies the incoming RF signal in accordance with its time-varying load, or impedance, characteristic $Z_L(t)$. Here digital waveform 207 is applied to a single bit band-pass delta sigma (ΔΣ) modulator 202. The output of single bit band-pass ΔΣ modulator 202 is applied to control at least two states of varying impedance 205.

Figure 3:
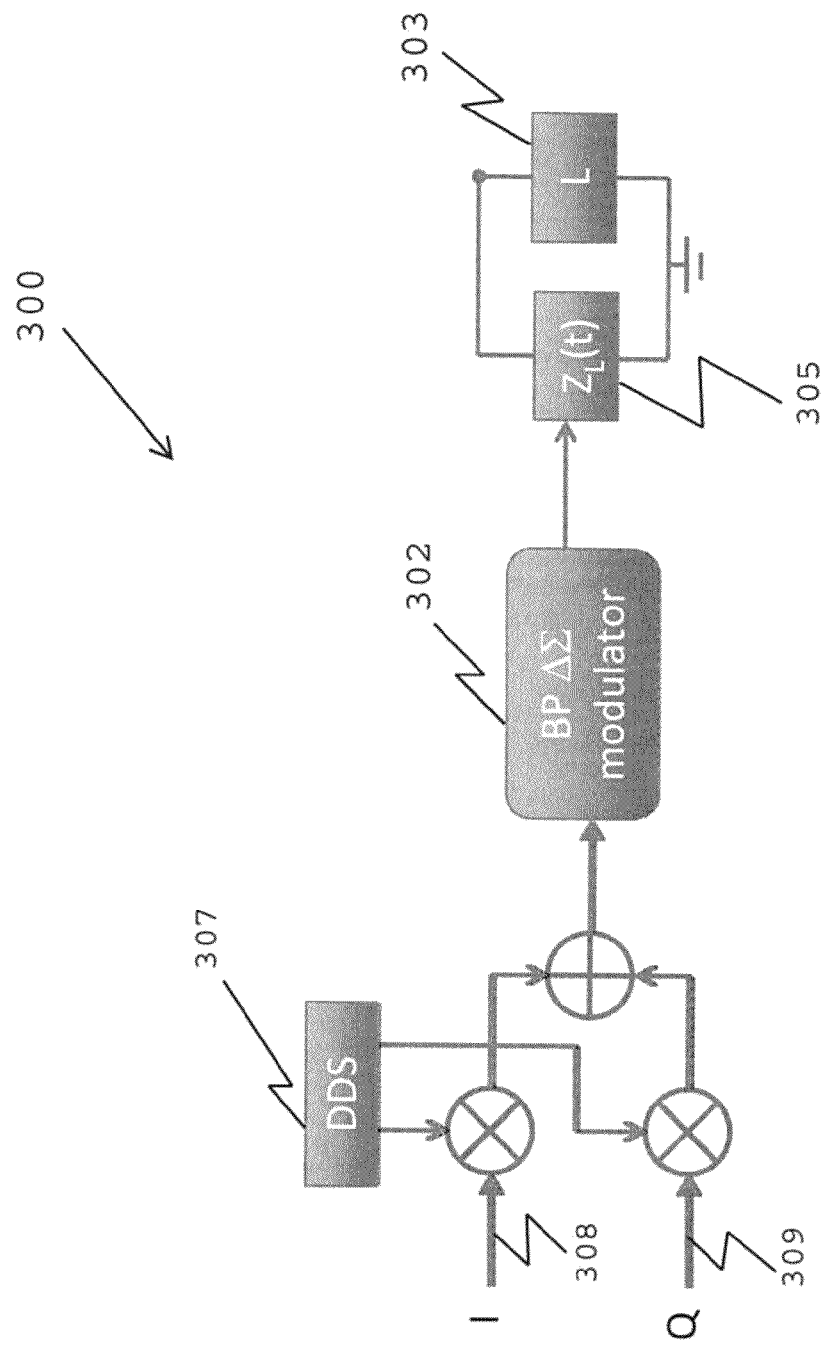
FIG. 3 shows, in one embodiment, an apparatus for generating an IQ signal offset by the frequency of a digital signal source such as a Direct Digital Synthesizer.

FIG. 3 shows, in one embodiment, apparatus 300 for generating an In-Phase—Quadrature (IQ) signal (308, 309) offset by the frequency of a digital signal source which, in one embodiment, may be Direct Digital Synthesizer (DDS) 307. The IQ signals (308, 309) to the mixers are generated by DDS 307. A band-pass delta sigma (ΔΣ) modulator 302 may be applied to generate a complex modulation signal. As referred to herein, the band-pass delta sigma modulator generates an output bit stream that represents the input data near the sampling frequency of the band-pass delta sigma modulator (denoted by fs) divided by 4. Above and below fs/4, quantized noise of the band-pass delta sigma increases until at some design cutoff point, the signal would be deemed to have too much quantization noise.

Still with reference to FIG. 3, the IQ signal to the mixers may be up-converted by direct digital synthesizer (DDS) 307, or a clock, at fs/4. The up-converted output signals are then applied to band pass delta sigma modulator 302. Band-pass delta sigma (ΔΣ) modulator 302 is applied at a sample rate fs to generate the complex modulation signal. As referred to herein, the band-pass delta sigma modulator generates an output bit stream that represents the input data from with the range of:

fs/4−BW/2 to fs/4+BW/2 where fs represents the sampling frequency of the band-pass delta sigma modulator, and BW represents a predefined bandwidth for which the band-pass delta sigma modulator is designed. The complex IQ signal of the inductive element of the tag device will be around frf+/−fs/4, where frf is the frequency of the reader device signal in the RFID network. Since the output bit stream is offset from the frequency of the reader device signal by fs/4, this both reduces the effect of DC offset in the reader device, and reduces the effects of the reader device's phase noise.

In this fashion, any type of complex modulation may be applied, including a Gaussian minimum shift keying (GMSK), nPSK, quadrature phase shift keying (QPSK), n-Quadrature Amplitude Modulation (nQAM), where n represents an integer, and an OFDM signal, and wherein an input signal applied to the band-pass delta sigma modulator consists of a complex modulation signal offset from the incoming radio frequency signal of the reader device by +/−$\omega_0$, where $\omega_0$ represents the frequency offset from the incoming RF signal.

In an embodiment, the inductive coupling apparatus may comprise part of a tag terminal electromagnetically coupled to a reader device within an RFID network or system wherein clocking of the band-pass delta sigma modulator may be driven based on a carrier signal frequency of the reader device, frf, divided by L, where L represents a positive numerical value In a further embodiment, the inductive coupling apparatus may comprise part of a tag terminal electromagnetically coupled to a reader device within an RFID network or system wherein generation of data from the IQ up-conversion modulator is driven by a clock circuit internal to the tag terminal.

Alternatively, the inductive coupling apparatus may comprise part of a tag terminal electromagnetically coupled to a reader device within an RFID network or system wherein generation of data from the IQ up-conversion modulator is driven by a clock circuit based on the carrier signal frequency of the reader device, frf, divided by M, where M represents a positive numerical value.

In one embodiment, the output of the band-pass delta sigma modulator 302 may be a return to zero (RTZ), so if the data is 1101101, the output would be 10100010100010; note there is a zero between each bit. In an alternate embodiment, the output of band-pass delta sigma modulator 302 may be a non-return to zero (NRZ) type signal; for example, if the data is 1101101, the output is 1101101, and nothing is added to the data stream.

In an embodiment, one or more filters may be in the variable impedance circuit to filter out of band noise output from band-pass delta sigma modulator 302.

Figure 4:
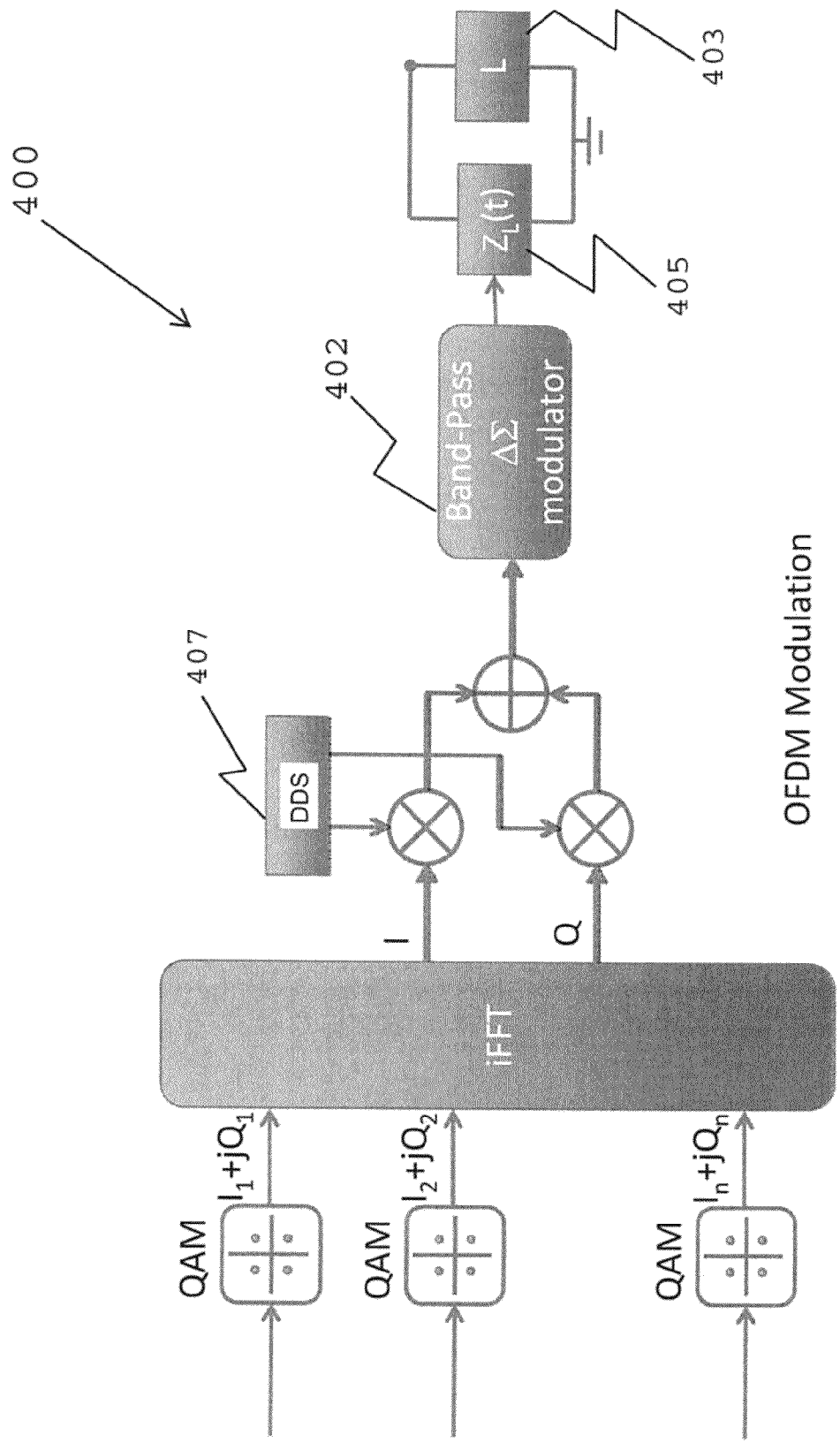
FIG. 4 shows, in one embodiment, an apparatus using band-pass modulation for generating an OFDM signal offset by the frequency of a digital signal source such as a Direct Digital Synthesizer.

FIG. 4 shows, in one embodiment, apparatus for Z-ΔΣ scheme 400 for generating an orthogonal frequency division multiplexing (OFDM) signal offset by the frequency of a digital signal source such as DDS 407. The input signal to the mixers is up-converted by direct digital synthesizer (DDS) 407, or a clock, at fs/4. The output signals are then applied to band-pass delta sigma modulator 402. Band-pass delta sigma (ΔΣ) modulator 402 is applied at a sampling rate fs to generate the complex modulation signal.

Figure 5:
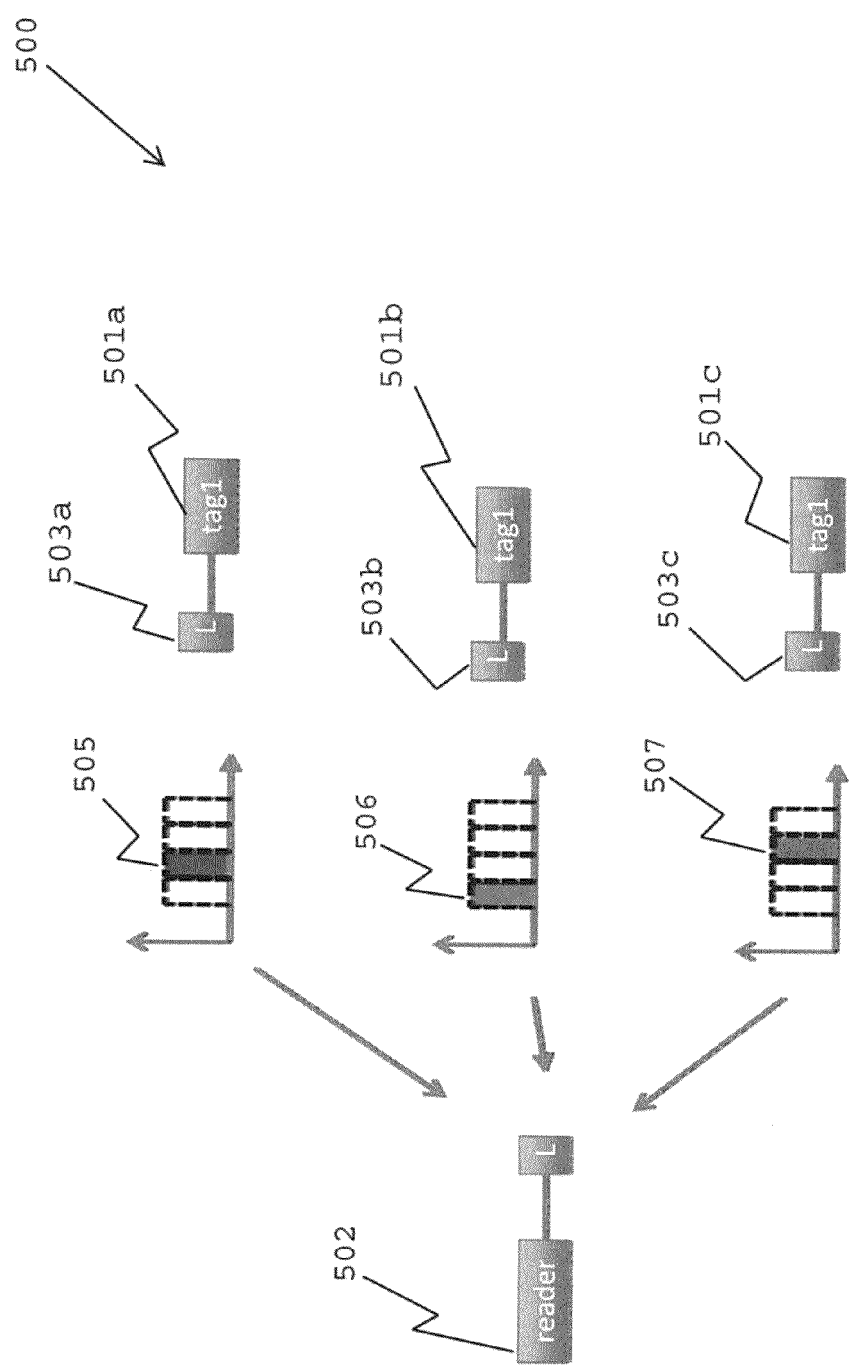
FIG. 5 shows an embodiment of an RFID system in which data transmission, via inductive coupling between from tag and reader, may be performed on dedicated frequency channels using band-pass modulation.

FIG. 5 shows an embodiment of an RFID communication network 500 in which data transmission from tag to reader is performed on dedicated frequency channels using the complex modulation apparatus and method for band-pass delta sigma modulation, by generating separate frequency channels 505, 505, 507 for each of the tags 501a-c used for data communication in RFID communication network 500. The complex modulation method and apparatus for band-pass delta sigma modulation of the coupled impedance are herein referred to, and denoted, as "the z-ΔΣ scheme". Inductive elements 503a-c in respective ones of tag terminals 501a-c modify the incoming RF signal, such as from reader device 502, in accordance with a coupled impedance characteristic, Z, of inductive elements 503a-c. A variable impedance circuit (not shown in FIG. 5) has an output electrically connected to inductive element 503a-c. A band-pass delta sigma modulator is coupled to an input of the variable impedance circuit to digitally control the output of the variable impedance circuit, such that coupled impedance Z of inductive element 503a-c may be adjusted by changing the output of the variable impedance circuit.

Figure 6A:
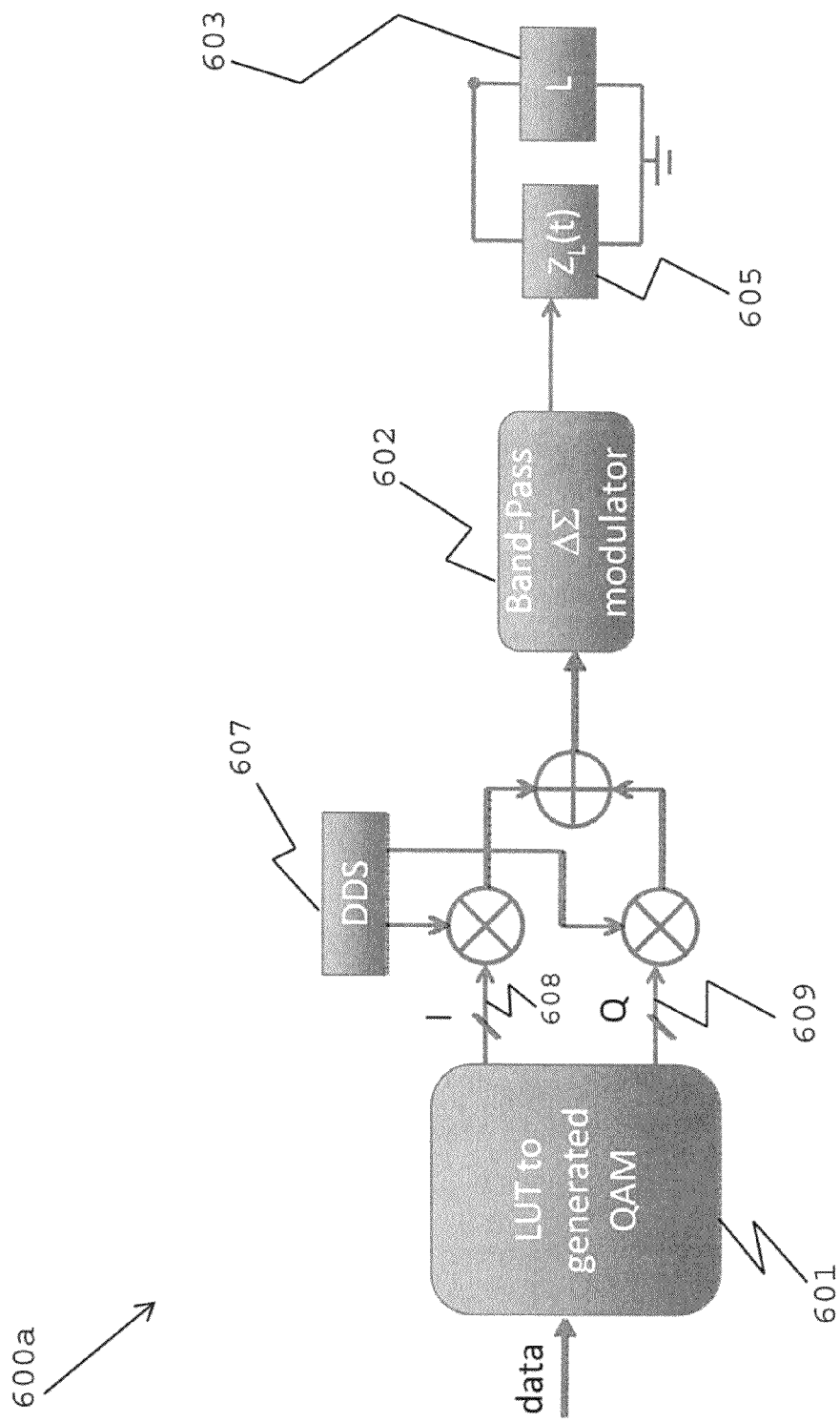
FIG. 6a shows, in one embodiment, an inductive coupled band-pass modulator apparatus for generating a QAM signal.

FIG. 6a shows, in one embodiment, inductive coupling Z-ΔΣ apparatus 600a for generating quadrature amplitude modulation (QAM) signals. Input data bits are applied to LUT (Look Up Table) 601 to generate the I and Q signals 608, 609. The I Q signals 608,609 are then up-converted to fs/4 and then applied to band-pass delta sigma modulator 502 which is sampled at fs.

Figure 6B:
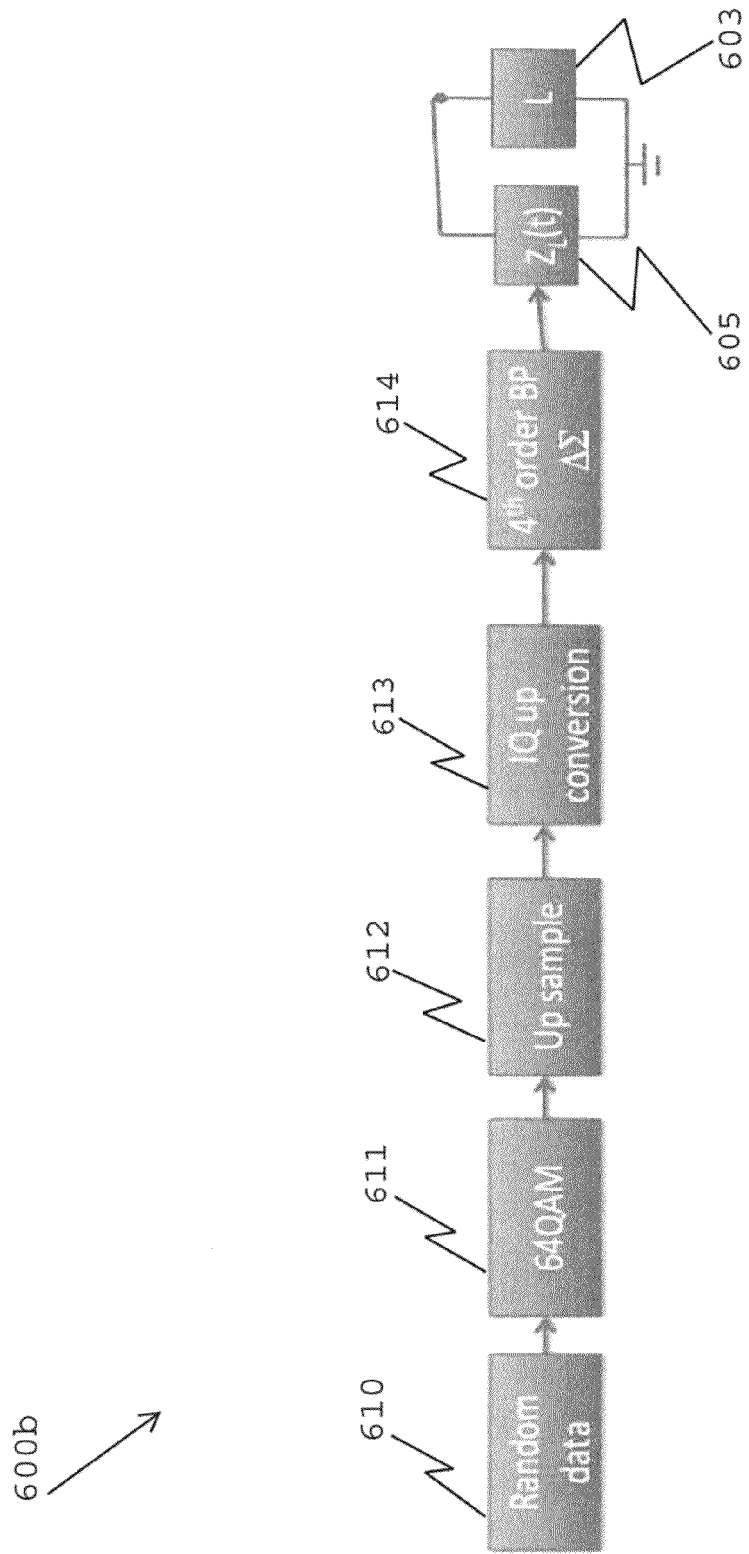
FIG. 6b shows, in one embodiment, a process for implementing of a system generating 64QAM data using band-pass modulation.

FIG. 6b shows, in one embodiment, 600B process for implementing of a system generating 64QAM data. The incoming IQ data at step 610 is used, at step 611 to generate the 64QAM data. The data is then up-sampled at step 612 and up-converted at step 613 to fs/4. A $4^{th}$ order band pass delta sigma modulator may then be applied to the signal at step 614, modulating the coupled impedance of inductive element 603 of a tag device of an RFID system. The output may then be demodulated by the reader of the RFID system and attendant output constellation diagram can be plotted for a given different level of signal-to-noise (SNR) ratio.

Figure 6C:
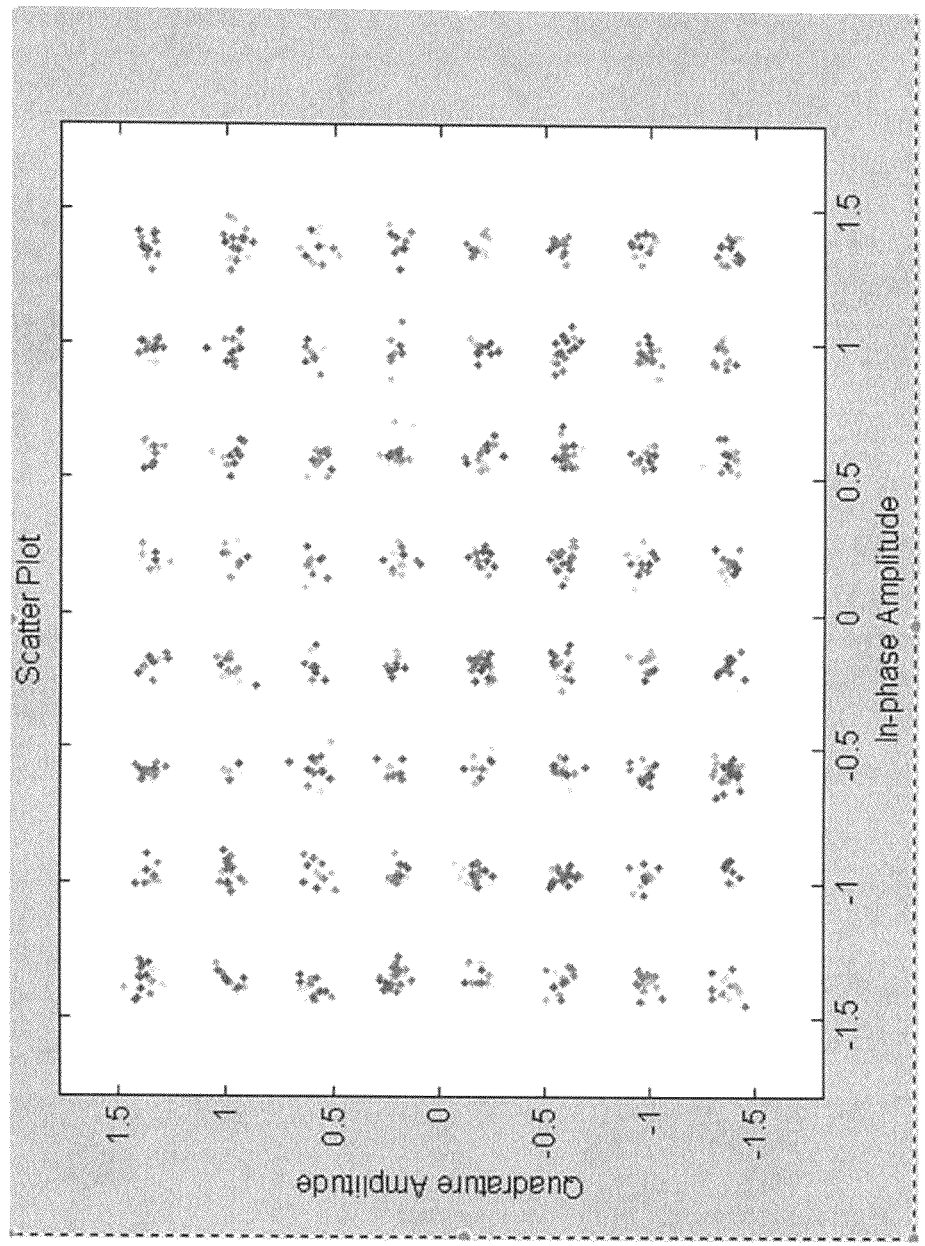
FIG. 6c shows a constellation diagram representation of the output of the 64QAM system apparatus of FIG. 6a with a signal to noise ratio of 13 dB.

FIG. 6c shows a constellation diagram representation of the 64QAM system output with a signal to noise ratio of 13 dB.

Figure 6D:
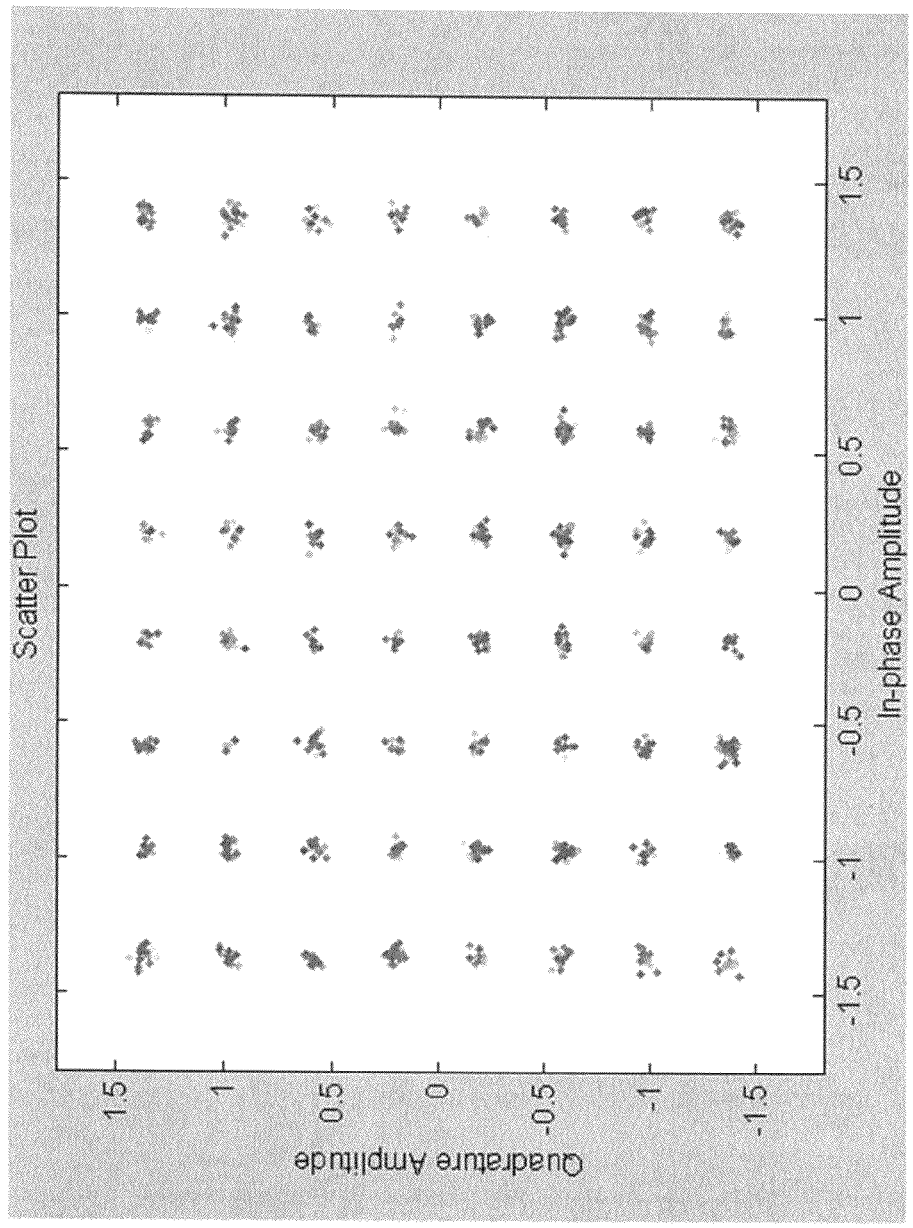
FIG. 6d shows a constellation diagram representation of the output of the 64QAM system apparatus of FIG. 6a with a signal to noise ratio of 22 dB.

FIG. 6d shows a constellation diagram representation of the 64QAM system output with a signal to noise ratio of 22 dB.

The constellation diagrams of FIGS. 6c and 6d show 64QAM modulation produced by applying the Z-ΔΣ scheme including the band-pass delta sigma modulator. The constellation diagrams are produced by taking the output from the inductive element of the tag device, that is, what the band-pass delta sigma modulator is driving, and then passing it through a reader device. The reader device performs down-conversion using the reader device's carrier signal RF frequency, digitizing the data via an analog to digital converter (ADC), then down-sampling the data and passing it through a digital filter, and finally demodulating the IQ data. The constellation plots of FIGS. 6c and 6d shown represents the demodulated data.

With regard to the clocking function utilized by the wireless tag terminal, such as for driving the band-pass delta sigma modulator, generation of the clocking function may be provided by a clock circuit within the tag reader, or via a clock circuit generation based on the frequency of the incoming RF signal provided by the reader device of the RFID network.

For example, in the instance of using the signal from the reader to enable the clocking function, if the reader is at frf, the clock used by the tag will be frf, or some frequency, frf/N, where N is some integer; that is frf is divided by N to generate the clocking function.

Although preferred embodiments of the invention have been described herein with regard to passive and semi-passive RFID communication networks, it is contemplated, and indeed it will be understood by those skilled in the art, that the solutions presented herein may be applied to other aspects of wireless communication. Accordingly, a person of ordinary skill in the art would understand that the specific embodiments described herein, while illustrative are not necessarily comprehensive. Thus, other various modifications may be made those skilled in the art without departing from the scope of the invention as defined by the claims.

What is claimed is:

1. An inductive coupling apparatus for modifying an incoming radio frequency (RF) signal comprising:
    an inductive element;
    a variable impedance circuit having an output electrically coupled to the inductive element; and
    at least one band-pass delta sigma ($\Delta\Sigma$) modulator coupled to the variable impedance circuit and digitally controlling the output of the variable impedance circuit;
    wherein the incoming RF signal is modified as the coupled impedance (Z) of the inductive element is adjusted in accordance with the output of the variable impedance circuit.

2. The inductive coupling apparatus of claim 1 wherein an output of the at least one band-pass delta sigma modulator switches the output of the variable impedance circuit between at least two states to adjust the coupled impedance.

3. The inductive coupling apparatus of claim 1 wherein an input signal applied to the band-pass delta sigma modulator comprises a complex modulation signal offset from the incoming radio frequency signal by $+/-\omega_o$.

4. The inductive coupling apparatus of claim 3 wherein the complex modulation signal consists of one of a GMSK, QPSK, nPSK, nQAM, and an OFDM signal.

5. The inductive coupling apparatus of claim 1 wherein an output of the band-pass delta sigma modulator is one of a return to zero (RTZ) and a non-return to zero (NRZ) type signal.

6. The inductive coupling apparatus of claim 1 comprising an IQ up-conversion modulator wherein the digitally controlled output is generated from an in-phase-quadrature (IQ) up-converted signal input to the band-pass delta sigma modulator.

7. The inductive coupling apparatus of claim 6 wherein the IQ up-conversion modulator up converts data around fs divided by 4, where fs is the sampling frequency of the band-pass delta sigma modulator.

8. The inductive coupling apparatus of claim 6 wherein input data provided to the IQ up-conversion module consists of one of a GMSK, QPSK, nPSK, nQAM, and an OFDM signal format.

9. The inductive coupling apparatus of claim 1 further comprising at least one filter device at the variable impedance circuit to filter out of band noise output from the band-pass delta sigma modulator.

10. The inductive coupling apparatus of claim 6, the inductive coupling apparatus comprising part of a tag terminal electromagnetically coupled to a reader device within a radio frequency identification (RFID) system wherein generation of data from the IQ up-conversion modulator is based on a clock circuit internal to the tag terminal.

11. The inductive coupling apparatus of claim 6, the inductive coupling apparatus comprising part of a tag terminal electromagnetically coupled to a reader device within a radio frequency identification (RFID) system, the reader device providing the incoming RF signal at a carrier signal frequency, wherein generation of data from the IQ up-conversion modulator is based on a clock circuit using the carrier signal frequency, frf, divided by M, where M represents a positive numerical value.

12. The inductive coupling apparatus of claim 6, the inductive coupling apparatus comprising part of a tag terminal electromagnetically coupled to a reader device within a radio frequency identification (RFID) system wherein clocking for the IQ up-conversion modulator is based on a clock circuit internal to the tag terminal.

13. The inductive coupling apparatus of claim 6, the inductive coupling apparatus comprising part of a tag terminal electromagnetically coupled to a reader device within a radio frequency identification (RFID) system, the reader device providing the incoming RF signal at a carrier signal frequency, wherein clocking for the IQ up-conversion modulator is based on a clock circuit using the carrier signal frequency, frf, divided by N, where N represents a positive numerical value.

14. The inductive coupling apparatus of claim 1 wherein the inductive element comprises part of a tag terminal, the tag terminal electromagnetically coupled to a reader device within a radio frequency identification (RFID) system, the RFID system comprising clocking the band-pass delta sigma modulator using a clock circuit within the tag reader.

15. The inductive coupling apparatus of claim 1 wherein the inductive element comprises part of a tag terminal, the tag terminal electromagnetically coupled to a reader device within a radio frequency identification (RFID) system, the reader device providing the incoming RF signal at a carrier signal frequency, the RFID system comprising clocking the band-pass delta sigma modulator using a clock circuit generated based on the carrier signal frequency divided by L, where L represents a positive numerical value.

16. The inductive coupling apparatus of claim 1 wherein the inductive element comprises part of a tag terminal, the tag terminal electromagnetically coupled to a reader device within a radio frequency identification (RFID) system, the reader device providing the incoming RF signal at a carrier signal frequency, wherein the reader device performs down-conversion on the modified RF signal using the carrier signal frequency, digitizing the IQ data via an analog to digital converter (ADC), down-sampling the digitized IQ data, digitally filtering the digitized IQ data, then demodulating the digitally filtered IQ data.

* * * * *